Nov. 9, 1948.                    M. S. CURTIS                    2,453,120
                    LOCATING AND LOCKING MECHANISM
                       FOR MACHINE TOOL TURRETS
Filed June 27, 1944                                   6 Sheets-Sheet 1

INVENTOR.
MYRON S. CURTIS
BY
Kwis Hudson, Boughton & Williams
ATTORNEYS

Nov. 9, 1948.
M. S. CURTIS
2,453,120
LOCATING AND LOCKING MECHANISM
FOR MACHINE TOOL TURRETS
Filed June 27, 1944
6 Sheets-Sheet 2
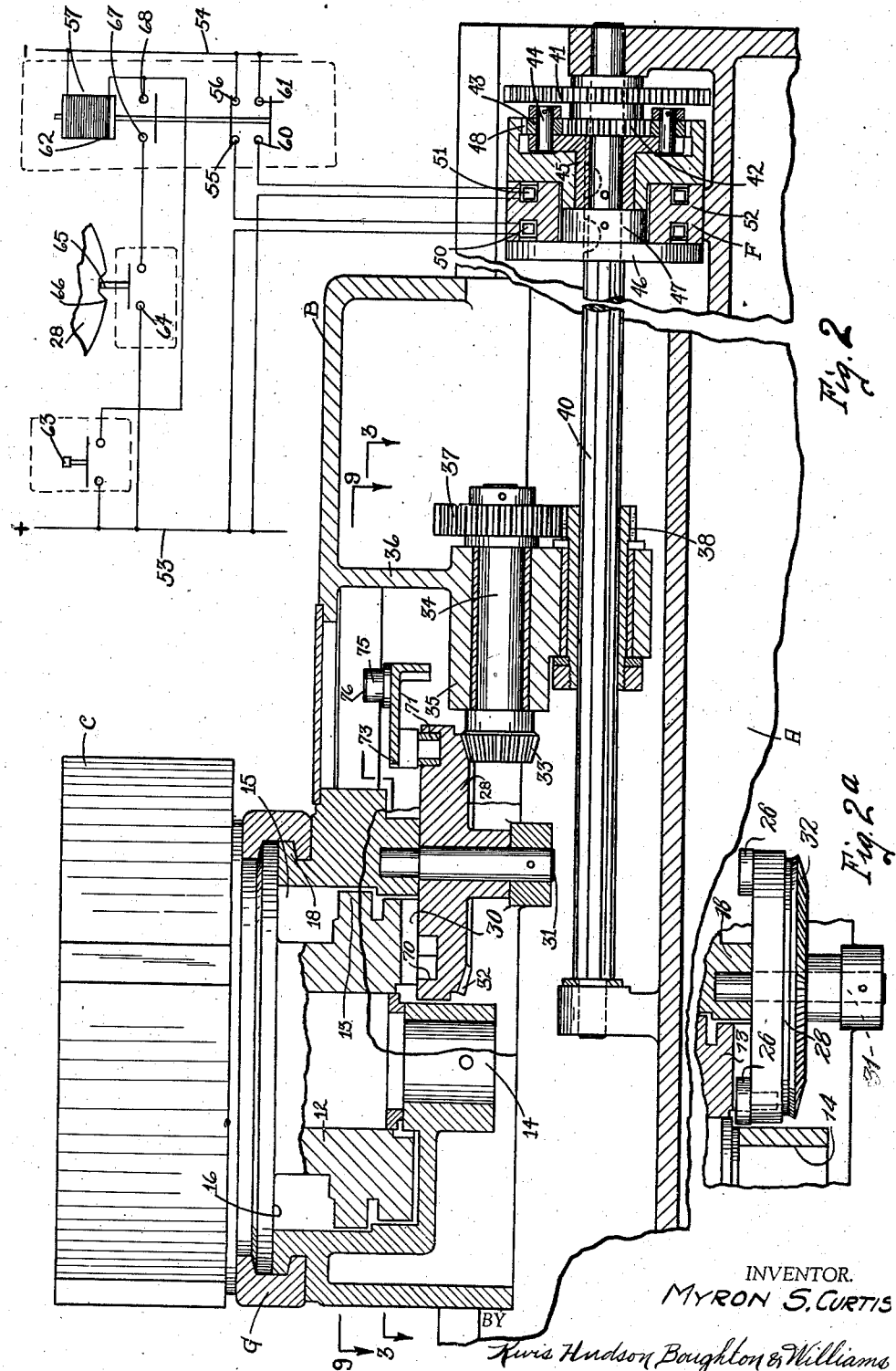
INVENTOR.
MYRON S. CURTIS
BY
Kwis Hudson Boughton & Williams
ATTORNEYS

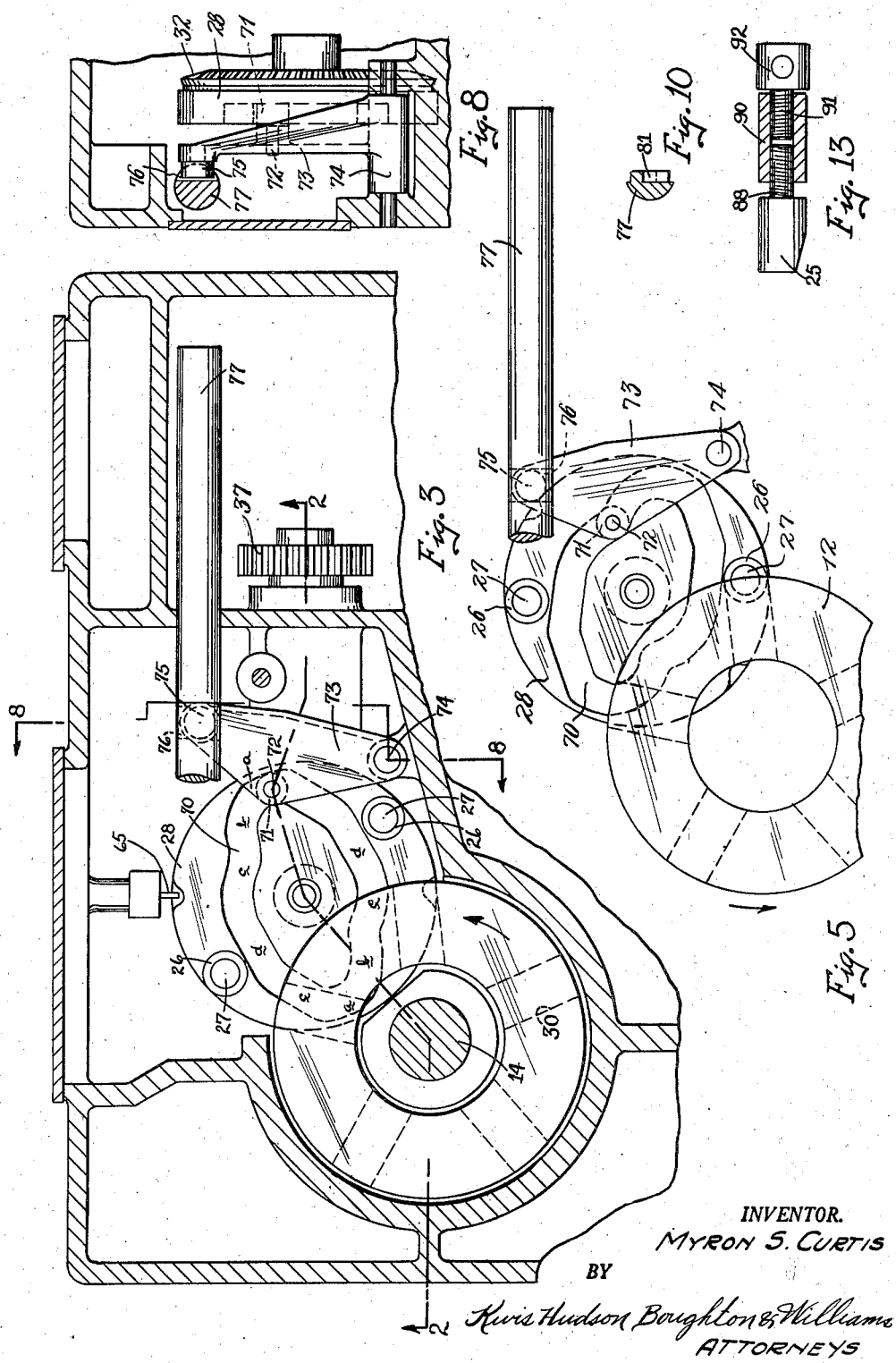

Nov. 9, 1948.   M. S. CURTIS   2,453,120
LOCATING AND LOCKING MECHANISM
FOR MACHINE TOOL TURRETS
Filed June 27, 1944   6 Sheets-Sheet 4
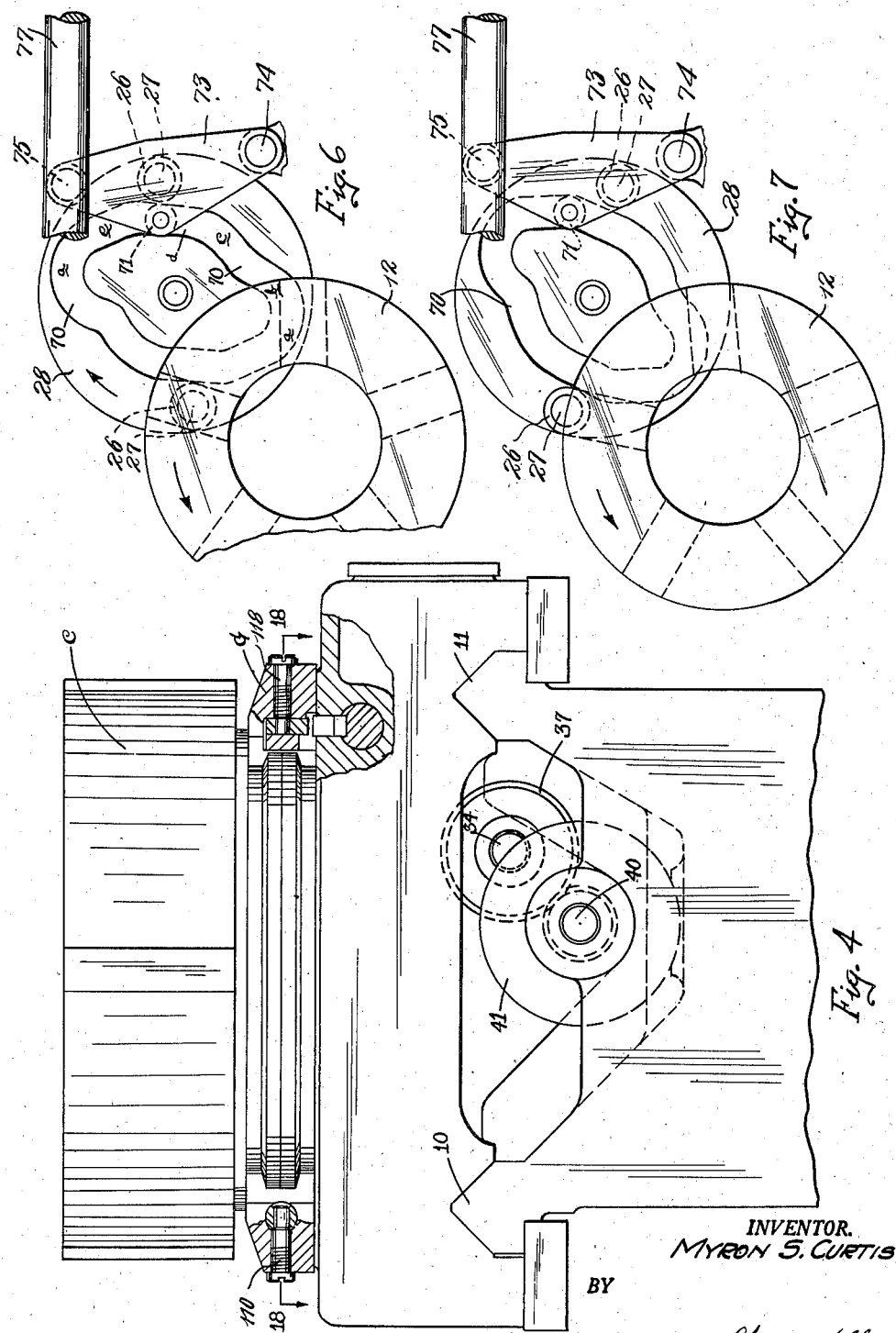
INVENTOR.
MYRON S. CURTIS
BY
Kwis Hudson Boughton & Williams
ATTORNEYS

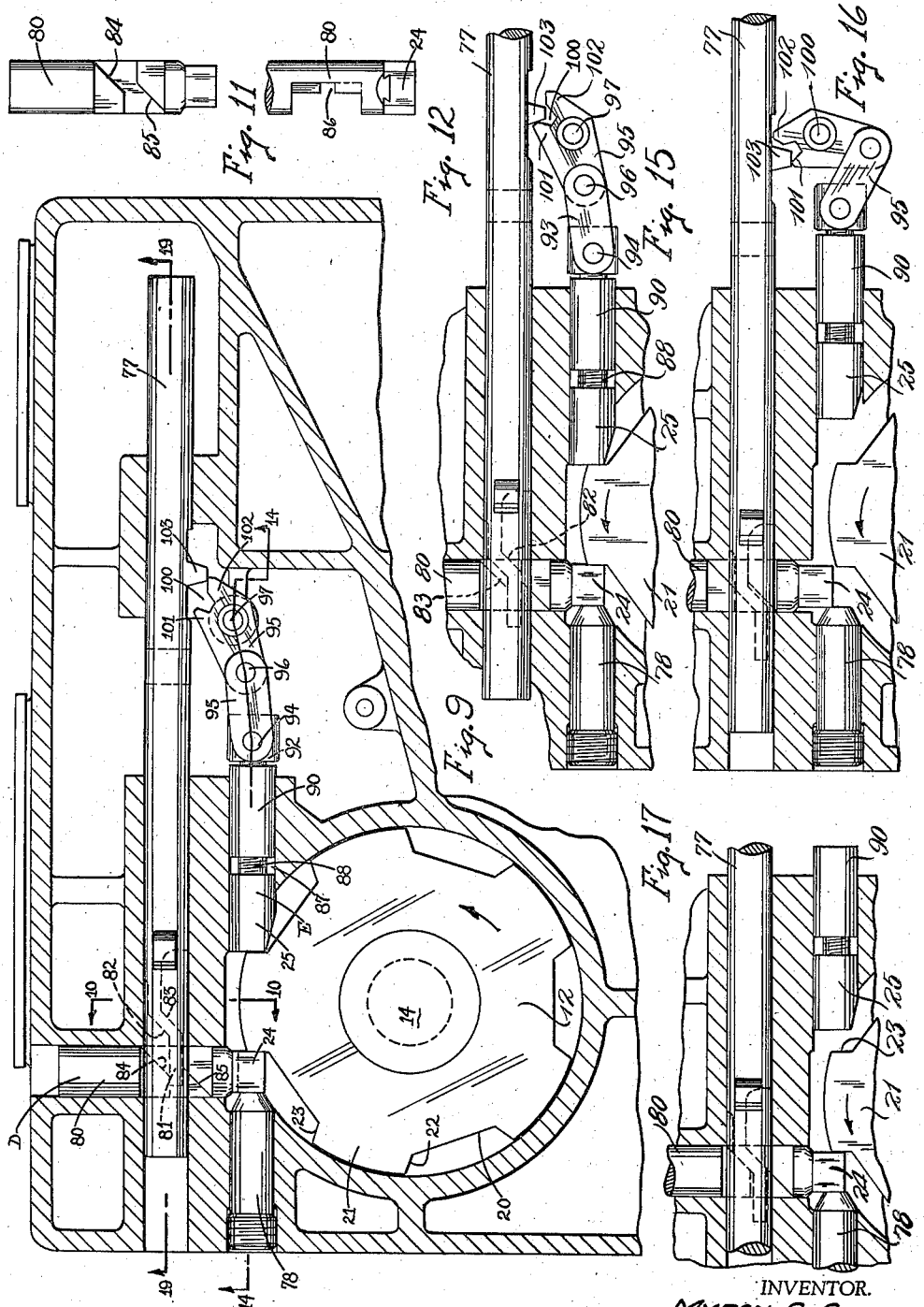

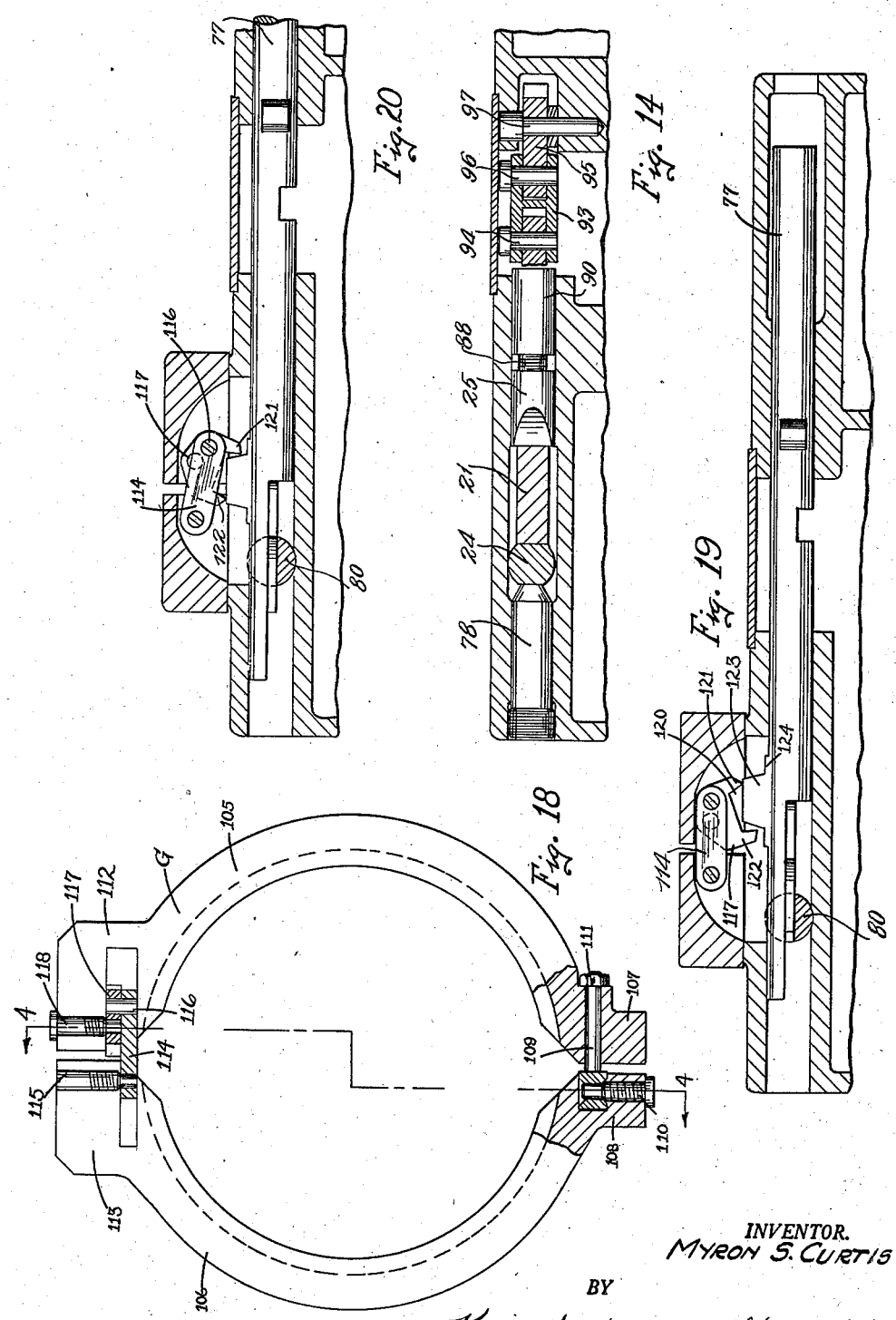

Patented Nov. 9, 1948

2,453,120

UNITED STATES PATENT OFFICE 2,453,120

LOCATING AND LOCKING MECHANISM FOR MACHINE-TOOL TURRETS

Myron S. Curtis, Cleveland, Ohio, assignor to The Warner & Swasey Company, Cleveland, Ohio, a corporation of Ohio Application June 27, 1944, Serial No. 542,290

9 Claims. (Cl. 29—50)

The present invention relates to machine tools and more particularly to power-operated indexing, locating, locking and clamping mechanisms for indexible members, such as the indexible turret of a machine tool or the like.

The principal object of the invention is the provision of an improved, novel and efficient power-operated mechanism for indexing, locating, locking and clamping an indexible member of a machine tool or the like, which mechanism is simple in construction, automatic, reliable and positive in operation, relatively inexpensive to manufacture, readily assembled and adjusted, substantially free from wear, and capable of accurately locating, locking and securely clamping the member in each of its indexed positions.

The invention resides in certain constructions and combinations and arrangements of parts, and further objects and advantages will be apparent to those skilled in the art to which the invention relates from this specification, including the following description of the preferred embodiment of the invention, described with reference to the accompanying drawings forming a part hereof, in which similar reference characters designate corresponding parts throughout the various views, and in which:

Fig. 2 is a sectional view with portions in elevation, approximately on the line 2—2 of Fig. 3 (Sheet 3).

Figure 1:
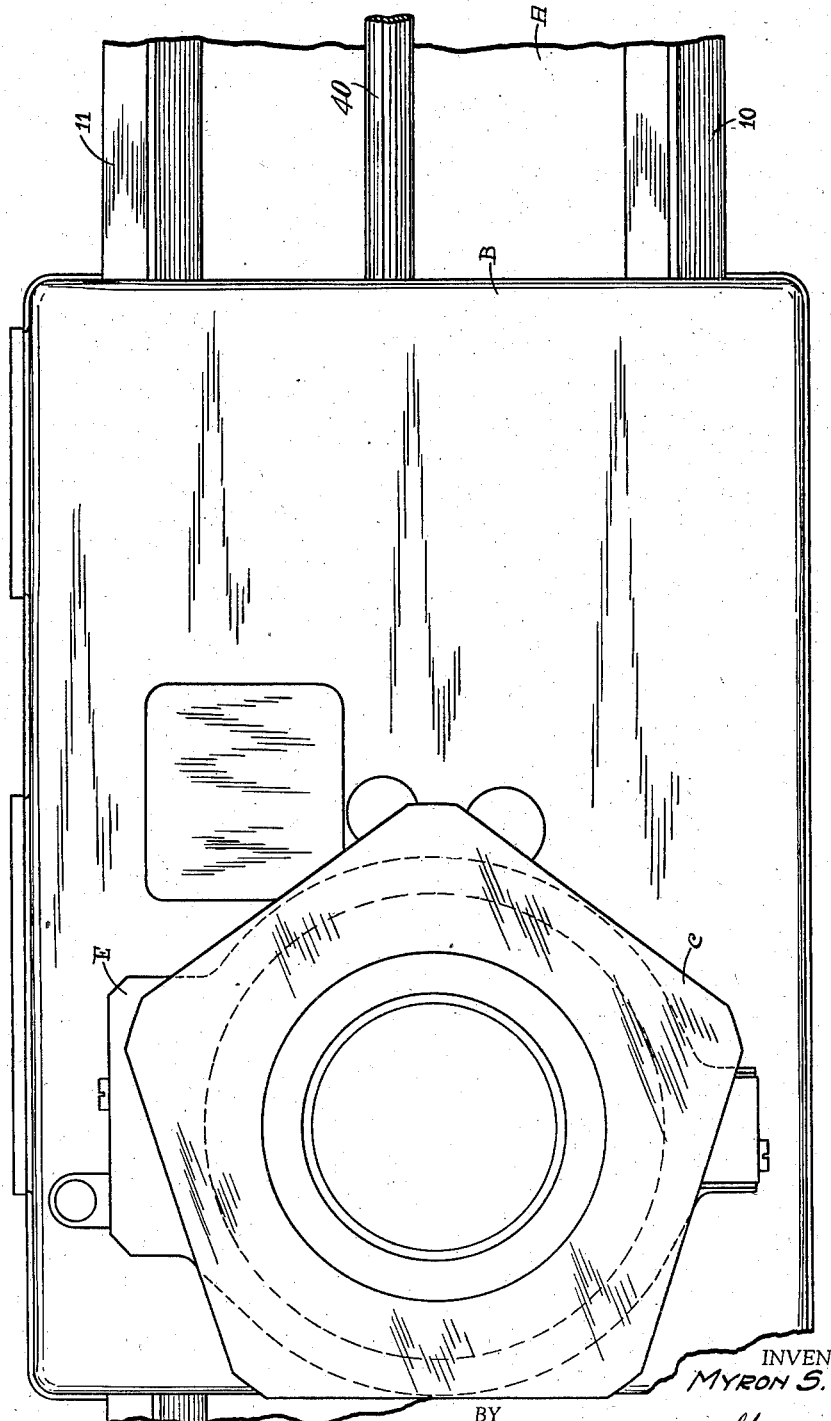
Fig. 1 is a fragmentary plan view of the turret slide portion of a turret lathe embodying the present invention.

Fig. 2ª (Sheet 2) is a fragmentary view of a portion of Fig. 2, with parts shown in elevation.

Fig. 3 is a sectional view approximately on the line 3—3 of Fig. 2.

Fig. 4 is a fragmentary end view of the lathe bed and turret slide shown in Figs. 1 and 2 with portions of the turret slide and turret clamping ring in section, approximately on the line 4—4 of Fig. 18 (Sheet 6).

Figs. 5 (Sheet 3), 6 (Sheet 4), and 7 (Sheet 4) are detached views of the operating elements shown in Fig. 3, showing different positions assumed thereby during the indexing operation.

Fig. 8 (Sheet 3) is a sectional view, with portions in elevation, approximately on the line 8—8 of Fig. 3.

Fig. 9 (Sheet 5) is a sectional view, with portions in elevation, approximately on the line 9—9 of Fig. 2.

Fig. 10 (Sheet 3) is a detached sectional view approximately on the line 10—10 of Fig. 9.

Fig. 11 (Sheet 5) is a detached plan view of the spacer assembly of the turret locating mechanism shown in Fig. 9.

Fig. 12 (Sheet 5) is a side elevational view of the spacer assembly of the turret locating mechanism shown in Fig. 11.

Fig. 13 (Sheet 3) is a detached sectional view of the adjustable locking assembly of the turret locating mechanism shown in Fig. 9.

Fig. 14 (Sheet 6) is a sectional view, with portions in elevation, approximately on the line 14—14 of Fig. 9.

Figs. 15, 16 and 17 (Sheet 5) are fragmentary views similar to Fig. 9 showing certain of the operating elements in different successive operative positions.

Fig. 18 (Sheet 6) is a detached plan view of the turret clamping ring with portions in section approximately on the line 18—18 of Fig. 4.

Fig. 19 (Sheet 6) is a sectional view, with portions in elevation, approximately on the line 19—19 of Fig. 9, and Fig. 20 (Sheet 6) is a view similar to Fig. 19, but showing the operating elements in a different operative position.

Although the invention is applicable to various types of machine tools, and the like, having indexible members, it is herein shown and described by way of illustration as embodied in a turret lathe. Lathes of the type referred to are well known in the art and only those parts which are necessary to a full understanding of the present invention are shown and described in detail.

Referring to the drawings and particularly Figs. 1 and 2 thereof, the reference character A designates generally the bed of a turret lathe, which bed is provided with the usual horizontal parallel ways 10 and 11 upon which the turret slide B is supported for movement towards and from a headstock located at one end of the bed and which headstock carries a rotatable work spindle. The turret slide B is shown in this instance as provided with a pentagonal turret C, including a downwardly extending tubular-like projection 12, see Fig. 2, having an annular radial flange 13 intermediate the ends thereof, which turret is indexible about a vertical center post 14 fixed to the turret slide and located in the center of an annular recess 15 in the turret slide and into which recess the projection 12 extends. The projection 12 is of less diameter than the diameter of the turret proper and the shoulder 16 formed by the reduction in diameter rests upon the upper end of a cylindrical flange 18 surrounding the recess 15.

The tools employed for performing the various operations are attached to the different faces of the turret in a well known manner, and the turret is intermittently indexed by indexing mechanism hereinafter fully described to successively bring the various faces into a position opposite the spindle in the headstock. The indexing operation is performed when the turret slide is in a retracted position with the tools clear of the work. For the purpose of accurately locating the turret in its various indexed positions the annular flange 13 on the projection 12 is provided with a plurality of vertical slots or splines 20, see Fig. 9 (Sheet 5), in the present instance five, which form five radial projections 21 having vertical sides forming abutments 22, 23 adapted to be engaged by the spacer block 24 of a locating assembly D and the locking member 25 of an adjustable locking assembly E, respectively. The block 24 and member 25 are moved in a manner and by mechanism hereinafter described to disengage and reengage the sides 22 and 23 of the projections 21 in predetermined timed relation to the indexing of the turret C. The turret C is located and locked in indexed positions by the block 24 and locking member 25 and their associated parts which will be described hereinafter in detail.

The turret C, as shown, is adapted to be periodically indexed by rollers 26 (see Figs. 2a, 3, 5, 6 and 7) supported for rotation on pins 27 carried by and projecting from the upper side of a disk 28, which index rollers are adapted to engage within radially extending index slots 30 in the underside of the projection 12 upon rotation of the disk 28. In the present instance five slots 30 are employed corresponding with the five faces of the turret C and the turret is indexed one-fifth of a complete rotation upon each one-half revolution of the disk 28 which accounts for the use of two rollers 26. Because of the employment of the two rollers 26 it is possible to so time the movement of the index rollers and the turret locating, locking and clamping mechanisms that the turret is under the control of one or the other thereof at all times.

The disk 28 is supported for rotation about a vertical shaft 31 fixed in the turret slide B and has a bevel gear 32 formed on the under face thereof through the medium of which the disk is rotated (see Figs. 2 and 2a). The gear 32 is continuously in mesh with a bevel pinion 33 fixed to one end of a shaft 34 rotatably supported in a boss 35 formed integral with an interior web 36 in the turret slide B. A spur gear 37 fixed to the opposite end of the shaft 34 is continuously in mesh with a spur pinion 38 having an elongated hub through the medum of which it is rotatably supported in the web 36 but held against axial movement. The gear 38 is splined to a longitudinally extending shaft 40 rotatably supported in the bed A and adapted to be periodically connected by a magnetic clutch designated generally by the reference character F, to a continuously driven gear cluster comprising the gears 41, 42. The gear 41 is continuously in mesh with a gear, not shown, operatively connected to and driven by any suitable driving means and the gear 42 is continuously in mesh with a plurality of planet gears 43 which are rotatably supported on stub shafts 44 carried by a spider member 45 which is keyed to the splined shaft 40 adjacent to the right hand end thereof as viewed in Fig. 2. The splined shaft 40 is provided with a disk 46 fixed to a spacer member 47 keyed to the shaft 40 and interposed between the disk 46 and the hub portion of the spider member 45. The magnetic clutch F is interposed between the adjacent sides of the disk 46 and the left hand or rear side of an internal gear 48 supported for rotation upon the hub of the spider member 45 and comprises two coils 50 and 51, one located adjacent to the disk 46 and the other adjacent to the internal gear 48.

The teeth of the internal gear 48 are continuously in mesh with the planet gears 43 and constitute the orbit gear of the planetary gear transmission comprising the sun gear 42, the planet gears 43 and the orbit gear 48. The construction is such that when the coil 50 is energized and the coil 51 is deenergized the disk 46 is attracted to the stationary frame 52 of the magnetic clutch F, with the result that the indexing mechanism including the splined shaft 40 is held stationary while the orbit gear 48 is rotated idly on the spider member 45. When the coil 50 is deenergized and the coil 51 energized the orbit gear 48 is attracted to the stationary frame 52 of the magnetic clutch and held against rotation with the result that the spider member 45 and, in turn, the indexing mechanism including the disk 28 etc. are rotated, the sun gear 42 rotating the pinions 43 which roll around the orbit gear 48.

The electric coil 50 of the magnetic clutch F is ordinarily maintained energized from the power lines 53, 54 by the normally closed contacts 55, 56 of a solenoid operated relay 57 to hold the indexing mechanism inactive and is deenergized to release the indexing mechanism and render the same active. The coil 51 is energized to drive the indexing mechanism upon actuation of the relay 57 to open the normally closed contacts 55, 56 and close the normally open contacts 60, 61 thereof. The operating solenoid 62 of the relay 57 is energized by the momentary closing of a normally open push button switch 63 located at some convenient place about the machine and said switch is manually operated by the operator when he desires to index the turret.

When the turret begins to rotate a holding circuit for the operating solenoid 62 is established by the closing of a normally open limit switch 64 located adjacent to the disk 28, the plunger 65 of which switch engages within a slot or recess 66 in the periphery of the disk 28 when the turret is locked and clamped in indexed position, but which rides on the periphery of the disk during the indexing of the turret. The switch 64 is in series circuit with normally open contacts 67, 68 of the relay 57, which contacts prevent operation of the indexing mechanism in the event the plunger 65 of the switch 64 is accidentally depressed or is depressed incident to manual rotation of the turret. If desired, provision may be made for automatically actuating the switch 63 to energize the operating solenoid 62 of the relay 57 in timed relation to the reciprocation of the turret slide B towards and from the spindle in the headstock.

The upper surface of the disk 28 is provided with an irregular continuous cam groove 70, the opposite sides of which are alike since the disk 28 makes only one-half of a revolution during each indexing operation. The groove 70 is continuously engaged by a roller 71 supported for rotation about a pin 72 fixed to a lever 73 and projecting downwardly from the underside thereof. The roller 71 is located approximately midway between the ends of the lever 73 and the lower end thereof, as viewed in Fig. 3, is pivotally connected to the turret slide B by a pivot pin 74. The opposite end of the lever 73 is provided with a roller 75 located at its upper side and supported for rotation about a pin projecting from the lever. The roller 75 engages within a slot 76 in the under side of a horizontal operating rod 77 for the turret locating and clamping mechanisms. The operating rod 77 is slidably supported in the turret slide and the slot 76 extends transversely of the length thereof, which rod, as shown, is parallel with the longitudinal center line of the lathe. The construction is such that upon each half rotation of the disk 28 the operating rod 77 makes one complete reciprocation. The operating rod 77 is shown in Fig. 9 (Sheet 5) in its extreme right hand position with one of the locating projections 21 located and locked between the locating block 24 and the adjustable locking member 25.

In addition to the locating block 24 the locating mechanism comprises a stationary but adjustable stop member 78 (see Figs. 9, 15, 16 and 17, Sheet 5) threaded into a suitable aperture in the turret slide, the inner end of which stop forms a positive abutment for the locating block 24 when in operative position. The locating block 24 which forms a part of the locating assembly D is slidably connected by a dovetailed tongue and groove connection to the inner end of a member 80 slidably supported in the turret slide for movement transversely of the operating rod 77 and the stationary stop member 78. The member 80 is reciprocated in timed relation to the indexing of the turret first to withdraw the block 24 from a position intermediate the stationary stop 78 and the locating projection 21 engaged thereby to permit rotation or indexing of the turret, and then to project the same into the path of the next following locating projection. This reciprocation of the member 80 is accomplished by a longitudinally extending projection or tongue 81 formed on the under side of the operating rod 77 and which includes transversely inclined cam surfaces 82, 83 on opposite sides thereof, which cam surfaces cooperate with similarly inclined cam surfaces 84, 85 on the member 80 formed in the upper side thereof by an irregularly shaped slot 86. The left hand end of the tongue 81, as viewed in Fig. 9, extends beyond the cam surfaces 82, 83 and maintains positive control of the member 80 when in projected position. The cam surfaces 82, 83 and 84, 85 are so constructed as to effect positive movement of the member 80 in both directions.

The locking assembly E is slidably supported in an aperture 87 in the turret slide, which aperture is in line with the aperture within which is mounted the stationary stop 78 and the locking member 25 of this assembly comprises a shank 88 having threaded engagement with a turnbuckle sleeve 90, the opposite reverse threads of which engage a reduced threaded shank 91 of a member 92 pivotally connected to a link 93 by a pin 94 (see Figs. 13 (Sheet 3), 9, 15 and 16 (Sheet 5)). The opposite end of the link 93 is pivotally connected to one arm of a toggle lever 95 by a pin 96, which toggle lever is pivotally connected intermediate its ends to the turret slide B by a bearing pin 97. The free end of the toggle lever 95 has a groove 100 therein, which groove is similar in shape to an interdental space of a gear tooth. The groove 100 is located between or formed by projections 101, 102, which projections are somewhat similar to gear teeth and cooperate with a gear tooth-like projection 103 of the operating rod 77. When the outer end of the tooth-like projection 103 is in engagement with the end of the tooth-like projection 102, which is the position shown in Fig. 9 (Sheet 5) the locking member 25 is projected its maximum distance towards the stationary stop member 78 and the end thereof is in engagement with the right hand abutment 23 of a locating projection 21, while the left hand side or abutment 22 of said locating projection is in engagement with the locating block 24 which, in turn, is in engagement with the stationary stop member 78. When the operating rod 77 is in the position referred to rotation of the toggle lever 95 in a direction to release the locking member 25 is prevented by the engagement of the ends of the tooth-like projections 102, 103. The construction is such that the turret C is located and locked securely in one of its indexed positions against rotation in either direction.

As will be hereinafter explained movement of the operating rod 77 towards the left from the position shown in Fig. 9 causes the tooth-like projection 103 to clear the tooth-like projection 102 on the toggle lever 95 and to engage the tooth-like projection 101 thereon, see Fig. 15 (Sheet 5), whereupon continued movement of the operating rod 77 toward the left rotates the toggle lever 95 from the position shown in Fig. 15 to the position shown in Fig. 16, withdrawing the locking member 25 to a position where it will not interfere with rotation of the turret C. Reference to Fig. 15 will disclose that a slight continued movement toward the left of the rod 77 first causes a slight retraction of the locking member 25 before the cam surfaces 82 and 84 cooperate to start retraction of the locating block 24, that is, the pressure of member 25 on the turret is relieved before block 24 moves, thus reducing wear on the parts. Simultaneously, the locating block 24 is moved or withdrawn from the position shown in Fig. 15 to the position shown in Fig. 16. The movement of the rod 77 to the left, from the position shown in Fig. 9 to the position shown in Fig. 15 causes the turret to be unclamped by mechanism later to be described. The movement of the rod 77 to the left from the position shown in Fig. 15 to the position shown in Fig. 16 causes the locking member 25 and the locating block 24 to be withdrawn substantially simultaneously. The stationary stop member 78 is made adjustable, as previously stated, for the purpose of compensating for any wear which might occur and for varying or adjusting the indexed positions of the turret when desired.

The member 80 is moved by the cooperating cam surfaces 83, 85 to project the locating block 24 partially in front of the stationary stop member 78 upon initial movement of the operating rod 77 in the reverse or right hand direction see Fig. 17 (Sheet 5). The construction is such that the block 24 is fully projected at substantially the same time the locking member 25 engages the abutment 23 of the locating projection then in position to be engaged thereby. The tongue and groove connections between the block 24 and the member 80 which permits limited relative movement between these members lengthwise of the stationary stop member 78 allow the block 24 to shift slightly towards and from the end of the stop member 78 without producing any binding of the member 80 in the aperture within which it is slidably supported.

The engagement of each locating projection 21 between the locking member 25 and the locating block 24 is for locking the turret C in accurately located indexed position during each machining operation of the lathe.

A segmental clamping ring G comprising the segmental portions 105, 106 is provided for clamping the turret C onto the turret slide B, see Figs. 2, 4 and 18 (Sheet 6). The inner circumference of the segmental ring G is formed with conical upper and lower surfaces which engage similar conical surfaces on the turret proper and the flange 18 on the turret slide B, which conical surfaces act, when the clamping ring G is contracted, to draw the turret in a downward direction into tight engagement with the turret slide and to fixedly secure the turret and turret slide together.

The respective ends of the segmental portions 105, 106 are offset radially and spaced a small distance apart to accommodate the connecting and operating mechanisms and to permit contraction of the clamping ring G. The forward projections 107, 108 of the segmental portions 105, 106 are provided with aligned apertures of different diameter, within which apertures a bolt 109 is located for pivotally connecting the segmental portion together. The left hand end of the bolt 109, see Fig. 18, is in the form of an enlarged eye and is located in the aperture in the projection 108, and is detachably secured therein by a transversely extending screw 110, the inner reduced end of which engages within the eye of the bolt. The right hand end of the bolt 109, extends through the projection 107 and is provided with a nut 111 which affords means for adujsting the front ends of the clamping segments 105, 106 towards and from each other.

The rear projections 112, 113 of the segmental portions 105, 106, respectively, are connected together by toggle mechanism located in aligned apertures in the projections 112, 113 and comprising a link 114 pivotally conected to the projection 113 by a screw 115, the inner reduced end of which projects through a suitable aperture in the left hand end of the link 114. The other end of the link 114 is pivotally connected by a pin 116 to a toggle lever 117, which toggle lever is, in turn, pivotally connected to the projection 112 by a screw 118, the inner reduced end of which projects through a suitable aperture in the toggle lever 117. The pivot 118 for the toggle lever 117 is intermediate the pivots 115 and 116 for the link 114, with the result that the clamping ring G is expanded or contracted upon rotation of the toggle lever 117 about its pivot, depending upon the direction in which the toggle lever is moved.

For the purpose of operating the clamping ring the lower side of the toggle lever 117 is provided with an elongated slot 120 formed by downwardly extending projections 121, 122, which slot somewhat resembles an elongated interdental space of a gear and cooperates with an upwardly extending projection 123 on a member 124 secured in a groove in the top of the operating rod 77. Alternately the projection 123 may be formed integral with the operating rod 77. The projections 121, 122 on the toggle lever 117 somewhat resemble gear teeth and the construction is such that when the operating rod 77 is in its extreme right hand position which is the position shown in Fig. 19, the toggle lever 117 is in its extreme counterclockwise position with the right hand projection 121 riding upon the top of the projection 123 the clamping ring contracted and the turret securely clamped to the turret slide. Upon initial movement of the operating rod 77 towards the left, see Fig. 19, incident to rotation of the disk 28, as previously described, the projection 123 disengages the projection 121 on the toggle lever 117 and engages the projection 122 thereon, whereupon continued movement of the operating rod 77 rotates the toggle lever in a clockwise direction, releasing the clamping ring G. The timing is such that the clamping ring is released prior to the unlocking and indexing of the turret and is contracted to clamping position after the turret has been indexed, located and locked. As the movement of the operating rod 77 continues the left hand projection 122 of the toggle lever 117 rides upon the top of the projection 123. The length of the projection 123 is such that the end of the projection 122 remains on the top of the projection 123 throughout the continued movement of the operating lever 77 towards the left.

From the foregoing description it is believed that the operation of the preferred embodiment of the invention shown and described above will be apparent. Suffice it to say that when the turret slide B is in a position wherein the tools are clear of the work piece and the turret C in one of its indexed pisitions the various parts of the locating, locking and clamping mechanisms are in the positions shown in Figs. 1, 2, 3, 9 and 19. The operating rod 77 is in its extreme right hand position with the projection 103 engaging the end of the projection 102 and holding the toggle closed. One of the locating projections 21 is securely held between the locking member 25 and the locating block 24 and the latter is located in front of the stop 78. The clamp ring G is contracted and the turret C securely clamped to the turret slide B with no thrust whatsoever on the center post. When the operator desires to index the turret C, he merely presses the start push button switch 63, whereupon the turret clamping and turret locating and locking mechanisms automatically and by power are released and the turret indexed, located and locked and subsequently clamped in a new indexed position without further attention on the part of the operator.

When the push button switch 63 is depressed, the operating circuit for the solenoid 62 of the relay 57 is established, opening the normally closed contacts 55, 56 and closing the normally open contacts 60, 61 and 67, 68. The opening of the normally closed contacts 55, 56 deenergizes the coil 50 of the magnetic clutch F, thus releasing or freeing the shaft 40. The closing of the normally open contacts 60, 61 energizes the coil 51 of the magnetic clutch F, connecting the shaft 40 to the rotating gear cluster 41, 42, whereupon the shaft 40 commences to rotate, which shaft, in turn, rotates the disk 28 through the medium of the bevel gears 32, 33, shaft 34, and spur gears 37, 38. Initial rotation of the disk 28 closes the normally open switch 64, which establishes a holding circuit through contacts 67, 68 for the operating solenoid 62 of the relay 57 and continues the indexing operation without the necessity of the operator maintaining the push button switch 63 closed. As previously stated, the plunger 65 of the switch 64 rides out of the groove 66 and engages the periphery of the disk 28 upon initial rotation thereof.

During the initial rotation of the disk 28 the roller 71 travels along the portion a of the cam groove 70, which portion is of uniform radius producing a slight dwell, which dwell is necessary for leeway in stopping and starting. Thereafter the cam roller 71 travels along the portion b of the cam groove which portion is of decreasing radius and produces a rotation of the lever 73 in a counterclockwise direction, thus moving the operating rod 77 towards the left. When the cam roller 73 has reached the position shown in Fig. 5 the operating rod 77 has moved to the position shown in Figs. 16 and 20. During the aforesaid movement of the operating rod 77 the projection 123 actuated the toggle lever 117 to release the turret clamp ring G, the projection 103 actuated or rotated the toggle lever 95 and the cooperating cam surfaces 82, 84 retracted the member 80 and the locating block 24, thus freeing the turret from the locating and locking mechanisms and permitting rotation thereof.

By this time the lower index roller 26 has entered the adjacent index slot 30, see Fig. 5, and continued rotation of the cam disk 28 rotates or indexes the turret one-fifth of a revolution. While the index roller 26 is traveling from the position shown in Fig. 5 to the position shown in Fig. 6 the cam roller 71 travels along the portion c of the cam groove 70, which portion is of substantially uniform radius and produces no movement of the operating rod 77. During movement of the roller 71 along the portion d of the cam groove 70, the operating rod 77 is given an initial movement towards the right and by the time the roller has reached the position shown in Fig. 6 the turret locating and locking mechanisms have been returned to the position shown in Fig. 17, with the locating block 24 almost fully projected and the locking member 25 nearing the abutment or side 23 of the locating projection 21 then in position to be engaged thereby. The turret C is indexed by the roller 26 to within approximately one degree of its final position, thus leaving sufficient clearance between the end of the stationary stop 78 and the abutment 22 adjacent thereto for the locating block 24 to enter therebetween. The final rotation of the turret to its indexed position is accomplished by the locking member 25 as it moves to its extreme left hand position, see Fig. 9, to securely locate and lock the projection 21 between it and the locating block 24.

After the turret has been properly located and locked in indexed position the cam roller 71 travels along the portion e of the cam slot 70, which portion completes the return movement of the operating rod 77. During this period the toggle lever 117 is actuated by the stop 123 to contract the clamp ring G, thus securely clamping the turret to the turret slide. When the roller 71 enters the dwell portion a' of the cam slot 70, opposite to that in which it was located at the beginning of the cycle of operations, the plunger 65 of the switch 64 drops into the slot or recess 66 opposite the slot or recess in which it was initially positioned, thus opening the switch 64 and deenergizing the operating solenoid 62 of the relay 57. Deenergization of the operating solenoid 62 of the relay 57 opens the contacts 60, 61 thereof and closes the normally closed contacts 55, 56, thus deenergizing the coil 51 and energizing the coil 50 of the magnetic clutch F and stopping the rotation of the shaft 40. The various parts are now in the same position which they occupied at the beginning of the indexing operation except for the fact that the turret has been indexed one position and located, locked and clamped in such position.

The movement of the index rollers 26 is so timed with respect to the movement of the turret locating and locking mechanisms that the index roller about to perform the indexing operation is partially within the index slot 30 before the locating and locking mechanisms have wholly freed the turret. This prevents any accidental rotation of the turret which would interfere with the indexing operation. In like manner, the turret locating and locking mechanisms are returned to the position shown in Fig. 17 where they can engage the proper projection 21 before the index roller has left the index slot. It should be understood that any suitable type of turret, other than the pentagonal turret shown may be employed if desired.

From the foregoing description of the preferred embodiment of the invention it will be apparent that the objects heretofore enumerated and others have been accomplished and that novel and improved indexing, locating, locking and clamping mechanisms have been provided for indexible members of machine tools and the like, which mechanisms are simple in construction, reliable in operation and wholly automatic. While the preferred embodiment has been described with considerable detail, the invention is not limited to the particular construction shown but is susceptible of various modifications and adaptations and it is my intention to hereby cover all adaptations, modifications and uses thereof which come within the scope and spirit of the appended claims.

Having thus described my invention, I claim:

1. In a machine tool or the like, the combination of a frame, an indexible turret member rotatably supported by said frame and having a plurality of circularly spaced abutments each corresponding with an indexed position of the turret member, means for indexing said turret member, a locking member movably supported by said frame and adapted to engage one of said abutments for each indexed position of said turret member, a stationary stop member in alignment with said locking member, a locating member supported by said frame for movement transversely of the path of movement of said locking member and adapted to be interposed between said stop member and said one abutment for each indexed position of said turret member, means for clamping said turret member to said frame, power means for actuating said indexing means, locking member, locating member and clamping means in timed relation to each other whereby said turret member is successively unclamped, unlocked, indexed, located and locked in indexed position and then reclamped.

2. In a machine tool or the like, the combination of a frame, an indexible turret member rotatably supported by said frame and comprising an annular member or ring having a plurality of abutments each corresponding with an indexed position of said turret member, power actuated means for indexing said turret member, a locking member supported by said frame and adapted to engage one of said abutments for each indexed position of said turret member, power actuated means for moving said locking member in timed relation to the indexing of said turret member, a stationary stop member in alignment with said locking member, a locating member supported by said frame for movement transversely of the path of movement of said locking member and adapted to be interposed between said stop member and said one abutment for each indexed position of said turret member, power actuated means for moving said locating member in timed relation to the indexing of said turret member, and power actuated means for clamping said turret member to said frame.

3. In a machine tool or the like, the combination of a frame, an indexible turret member rotatably supported by said frame and comprising an annular member or ring having a plurality of oppositely facing abutments each corresponding with an indexed position of said turret member, power actuated means for indexing said turret member, a locking member supported by said frame for reciprocation tangentially of said ring and adapted to engage one face of one of said abutments for each indexed position of said turret member, power actuated means for reciprocating said locking member in timed relation to the indexing of said turret member, a stationary stop member in alignment with said locking member, a locating member supported by said frame for movement transversely of the path of movement of said locking member and adapted to be interposed between said stop member and the opposite face of said one abutment for each indexed position of said turret member, power actuated means for moving said locating member in timed relation to the indexing of said turret member, and power actuated means for clamping said turret member to said frame.

4. In a machine tool or the like, the combination of a frame, an indexible turret member rotatably supported by said frame and having a plurality of spaced abutments each corresponding with an indexed position thereof, a rotatable member supported by said frame, power actuated means for rotating said member, means carried by said rotatable member for indexing said turret member, a locking member movably supported by said frame and adapted to engage one of said abutments for each indexed position of said turret member, means for moving said locking member in timed relation to the rotation of said rotatable member, a stationary stop member in alignment with said locking member, a locating member supported by said frame for movement transversely of the path of movement of said locking member and adapted to be interposed between said stop member and said one abutment for each indexed position of said turret, means for reciprocating said locating member in timed relation to the rotation of said rotatable member, means for clamping said turret member to said frame, and means for actuating said last named means in timed relation to the rotation of said rotatable member.

5. In a machine tool or the like, the combination of a frame, an indexible turret member rotatably supported by said frame and having a plurality of spaced abutments each corresponding with an indexed position of the turret member, a rotatable member supported by said frame, means carried by said rotatable member for indexing said turret member, a locking member movably supported by said frame and adapted to engage one of said abutments for each indexed position of said turret member, a stationary stop member in alignment with said locking member, a locating member supported by said frame for movement transversely of the path of movement of said locking member and adapted to be interposed between said stop member and said one abutment for each indexed position of said turret member, means for clamping said turret member to said frame, a slidable member supported by said frame, means on said slidable member for reciprocating said locking member and said locating member and for actuating said last named means, and power actuated means for rotating said rotatable member and reciprocating said slidable member in predetermined timed relation to each other.

6. In a machine tool or the like, the combination of a frame, an indexible turret member rotatably supported by said frame and having a plurality of spaced abutments each corresponding to an indexed position of the turret member, a rotatable member supported by said frame, power actuated means for rotating said rotatable member, means on said rotatable member cooperating with said turret member for indexing the same, a locking member slidably supported in said frame and adapted to engage one of said abutments for each indexed position of said turret member, a stationary stop member in alignment with said locking member, a locating member slidably supported in said frame for movement transversely of the path of the movement of said locking member and adapted to be interposed between said stop member and said one abutment for each indexed position of said turret member, a clamp ring for clamping said turret member to said frame, a slidable member supported in said frame, means on said slidable member for reciprocating said locking member and said locating member and for actuating said clamp ring, and means for operatively connecting said rotatable member and said slidable member whereby said slidable member is actuated in timed relation to the rotation of said rotatable member.

7. In a machine tool or the like, the combination of a frame, an indexible turret member rotatably supported by said frame and having a plurality of spaced abutments and a plurality of radial grooves with each abutment and each groove correlated to an indexed position of the turret member, a disk-like member supported by said frame for rotation about an axis parallel to the axis of rotation of said turret member, means on said disk-like member cooperating with said grooves in said turret member for indexing the same, a locking member slidably supported in said frame and adapted to engage one of said abutments for each indexed position of said turret member, a stationary stop member in alignment with said locking member, a locating member slidably supported in said frame for movement transversely of the path of the movement of said locking member and adapted to be interposed between said stop member and said one abutment for each indexed position of said turret member, a clamp ring for clamping said turret member to said frame, a rod-like member slidably supported in said frame for movement tangentially of said turret member, means on said rod-like member for reciprocating said locking member and said locating member and for contracting said clamp ring, a lever operatively connected to said disk-like member and said rod-like member whereby said rod-like member is reciprocated upon rotation of said disk-like member, and power actuated means for rotating said disk-like member.

8. In a machine tool having an indexible member provided with a plurality of spaced abutments and a plurality of radially extending grooves, the said abutments and said grooves correlated to the different indexed positions of said member, a rotatable element provided with means cooperating with said grooves to index said member, a movable locking member for engaging one side of one of said abutments in each indexed position of said indexible member, a movable locating member for engaging the opposite side of said one abutment in each indexed position of the indexable member, a stationary stop member engaging said locating member, and operative connections between said rotatable element and said locking member and said locating member and including a cam groove in said element, a rockable lever provided with a roller engaging in said groove, a reciprocating member operatively connected with both said locking member and said locating member and acting to move the same to and from locking and locating position, and an operative connection between said lever and said reciprocating member whereby movement of said lever by said groove in said rotatable element actuates said reciprocating member.

9. A machine tool as defined in claim 8 and including means for clamping said indexible member in its various indexed positions, and operative connections between said clamping means and said rotatable element and including said cam groove, roller and lever and reciprocating member, and operating means interconnecting the reciprocating member and the clamping means.

MYRON S. CURTIS.

REFERENCES CITED

The following references are of record in the file of this patent:

UNITED STATES PATENTS

| Number | Name | Date |
|---|---|---|
| Re. 19,273 | Oberhoffken | Aug. 14, 1934 |
| 1,269,489 | Murphy | June 11, 1918 |
| 1,953,876 | Burrell | Apr. 3, 1934 |
| 2,143,255 | Abe | Jan. 10, 1939 |
| 2,176,897 | Fodor | Oct. 24, 1939 |
| 2,255,199 | Van Hamersveld | Sept. 9, 1941 |

FOREIGN PATENTS

| Number | Country | Date |
|---|---|---|
| 540,845 | Great Britain | Oct. 31, 1941 |